US005610448A

United States Patent [19]

Dattilo

[11] Patent Number: 5,610,448

[45] Date of Patent: Mar. 11, 1997

[54] UNIVERSAL SWITCHING DEVICE AND METHOD FOR LIGHTING APPLICATIONS

[75] Inventor: Donald P. Dattilo, San Diego, Calif.

[73] Assignee: International Energy Conservation Systems, Inc., Rancho Santa Fe, Calif.

[21] Appl. No.: 280,339

[22] Filed: Jul. 25, 1994

[51] Int. Cl.[6] .......... H02J 1/00

[52] U.S. Cl. .......... 307/39; 307/113; 315/313; 315/320

[58] Field of Search .......... 307/38, 39, 40, 307/41, 116, 139, 140, 112, 113, 115; 315/312–324; 363/125–128, 142, 143; 313/266, 267

[56] References Cited

U.S. PATENT DOCUMENTS

| | | | |
|---|---|---|---|
| 4,215,277 | 7/1980 | Weiner et al. | 307/41 |
| 4,259,614 | 3/1981 | Kohler | 315/219 |
| 4,322,632 | 3/1982 | Hart et al. | 307/41 |
| 4,390,814 | 6/1983 | Peek | 315/320 |
| 4,417,181 | 11/1983 | Leale | 315/209 |
| 4,480,197 | 10/1984 | Hollaway | 307/252 N |
| 4,488,092 | 12/1984 | Chikuma | 315/324 |
| 4,572,990 | 2/1986 | Leale et al. | 315/220 |
| 4,658,201 | 4/1987 | Notohamiprodjo | 323/224 |
| 4,667,132 | 5/1987 | Leale | 315/282 |
| 4,700,110 | 10/1987 | McNair et al. | 315/87 |
| 4,766,353 | 8/1988 | Burgess | 315/324 |
| 4,780,621 | 10/1988 | Bartleucci et al. | 307/11 |
| 4,794,271 | 12/1988 | McNair | 307/38 |
| 4,802,073 | 1/1989 | Plumly | 362/251 |
| 4,812,945 | 3/1989 | D'Onofrio | 361/154 |
| 4,879,495 | 11/1989 | Yamamoto | 315/362 |
| 4,888,494 | 12/1989 | McNair et al. | 307/30 |
| 4,896,079 | 1/1990 | Tabor | 315/313 |
| 4,896,083 | 1/1990 | Kopala et al. | 318/268 |
| 4,985,062 | 1/1991 | Willcocks et al. | 315/90 |
| 5,006,782 | 4/1991 | Pelly | 323/225 |
| 5,055,746 | 10/1991 | Hu et al. | 315/291 |
| 5,448,155 | 9/1995 | Jutras | 323/285 |

*Primary Examiner*—William M. Shoop, Jr.
*Assistant Examiner*—Jonathan S. Kaplan
*Attorney, Agent, or Firm*—Burns, Doane, Swecker & Mathis, LLP

[57] ABSTRACT

A universal electronic switching device which may be mounted inside various types of lighting fixtures to switch A.C. power to one or more loads, either individually or in groups, within the fixture in a predetermined pattern in response to an interruption of the A.C. line voltage through a serially connected, remotely located, wall switch. Each switching device is capable of switching any A.C. voltage from 120 vac to 350 vac to appropriate lighting loads or equipment such as fluorescent lamp ballasts, incandescent lamps, motorized lighting switches or relays.

21 Claims, 5 Drawing Sheets

OPERATING CHART

| STEP IN SWITCHING PATTERN | LOGIC OUTPUT "HI" | OUTPUT LOADS | | | |
|---|---|---|---|---|---|
| | | RELAY | MOTOR | LAMP | BALLAST |
| 1ST | Q0 | OFF | OFF | OFF | OFF |
| 2ND | Q1 | ON | OFF | OFF | OFF |
| 3RD | Q2 | OFF | ON | OFF | OFF |
| 4TH | Q3 | ON | ON | ON | OFF |
| 5TH | Q4 | OFF | OFF | OFF | OFF |
| 6TH | Q5 | OFF | OFF | ON | ON |
| 7TH | Q6 | --RESETS TO STEP 0 ------ | | | |
| 8TH | (Q7) | ---Q7 NEVER GOES "HI"---- | | | |

UNIVERSAL SWITCHING DEVICE AND METHOD FOR LIGHTING APPLICATIONS

BACKGROUND OF THE INVENTION

1. Field of the Invention

The present invention relates to novel improvements in remotely controlled power switching devices and, more specifically, to universal circuitry for switching electrical power, at any voltage from 120 vac to 350 vac, to one or more of a group of loads contained in one or more lighting fixtures or other electrical devices simultaneously, by toggling a single, remotely located, manually operated wall switch.

2. Description of the Prior Art

The prior art is replete with systems that switch one or more bands in response to an interruption of the A.C. power source through a single switch. For example: U.S. Pat. Nos. 4,766,353 and 4,802,073 describe electromechanical devices using latching relays to apply power to individual fluorescent lamps in a sequential manner. U.S. Pat. No. 4,390,814 uses a power controller in combination with latching relays to supply power to a number of electrical "zones" each of which is used to activate fluorescent lighting fixtures. U.S. Pat. Nos. 4,794271 and 4,888,494 use alternate action switches which are mechanically attached to a solenoid to switch between two lighting loads. U.S. Pat. No. 4,488,092 uses two serially connected switches to supply power to alternate bands. One switch is connected across an inductor which works in conjunction with an electronic timer circuit to determine which load has been selected. The other switch is used to actually transfer power to the selected load. U.S. Pat. Nos. 4,700,110 and 4,985,662 use latching relays that are momentarily energized by discharging capacitors through their coils to alternately switch between two lamp loads. U.S. Pat. No. 4,896,083 uses a low voltage control circuit including an integrated circuit ("D" Type Flip Flop) to energize transistors which apply an operating voltage to relays. The contacts of the relays are then used to supply A.C. power to a motor in a ceiling fan or an incandescent lamp in the same fixture, or both in a fixed sequence of operation. U.S. Pat. No. 4,480,197 is an "all electronic" switching circuit intended to control a ceiling fan and/or incandescent lamp by interrupting the A.C. power source for a specific time period which is different for each mode of operation desired. The circuit uses fixed time delays (resistor/capacitor circuits) to activate separate SCR's which act as a "shunt" across bridge rectifier circuits allowing A.C. power to be transferred to the intended loads. U.S. Pat. No. 4,322,632 is another electronic switching circuit configurated to operate a ceiling fan and incandescent lamp in a fixed sequence of operation. It uses two different integrated circuits (one 4584 Schmitt Trigger and one 4027 Flip Flop) to activate transistors as predrivers which trigger triacs to supply power to each load. U.S. Pat. No. 4,896,079 depicts an electronic switching circuit intended to operate fluorescent lamps upon alternate operations of a toggle switch. The circuit uses two integrated circuits (one 324 Quad Op-Amp and one 4027 Flip Flop configured as a "single-shot multivibrator"). It uses an Op-Amp as a predriver to activate a triac which supplies power to the load. U.S. Pat. No. 4,879,495 describes an electronic circuit that supplies power to four fluorescent light fixtures with two of the fixtures being activated on alternate operations of a serially connected wall switch. The circuit uses a "D" Type Flip Flop and an optical coupler as a predriver to activate a triac which supplies power to the load.

The prior art does not reveal an electronic switching circuit that energizes one or more loads upon the momentary interruption of A.C. power through a single serially connected wall switch that may be used universally on all A.C. lighting voltages including 120 vac, 220 vac, 277 vac and 347 vac without adding jumper connections or any extra switches whatsoever. Furthermore, no prior art uses a single integrated circuit counter (instead of Flip Flop's) to perform all the switching functions. Additionally no prior art uses only one integrated circuit to directly activate the triacs without the use of transistors, op-amps or optocouplers as predrivers. Also lacking in the prior art are any means of altering the sequence of operation to accommodate both 3-Lamp and 4-Lamp fluorescent fixtures without adding component parts. Additionally, the prior art does not disclose any means of extending or altering the number of loads or modifying their operational sequence, either individually or in combinations, without adding active elements like integrated circuits. And, finally, the prior art does not disclose any provisions for insuring that multiple groups of parallel connected devices will switch simultaneously without false triggering.

SUMMARY OF THE INVENTION

The present invention is directed to a universal electronic switching device which may be mounted inside various types of lighting fixtures to supply A.C. power to one or more loads, either individually or in groups, within the fixture in a predetermined pattern in response to an interruption of the A.C. line voltage through a serially connected, remotely located, wall switch. Each switching device is capable of switching all A.C. voltages used in lighting equipment including 120 vac, 220 vac, 277 vac and 347 vac without adding jumper connections or any extra switches whatsoever. Each output of the switching device may be used to supply A.C. power to all types of equipment used in the lighting industry including, magnetic ballasts, electronic ballasts, incandescent lamps, motorized lighting switches and relays. When two or more of the switching devices are used inside two or more lighting fixtures (one device in each fixture) and wired parallel through a serially connected single-pole-single-throw wall switch to a source of A.C. power, then all switching devices will operate simultaneously upon activation of the wall switch thus providing an inexpensive and reliable means of evenly controlling the number of fluorescent or incandescent lamps lit in each lighting fixture thereby regulating the amount of illumination emitted and the related cost of operation incurred.

DESCRIPTION OF THE PREFERRED EMBODIMENTS

Figure 1:
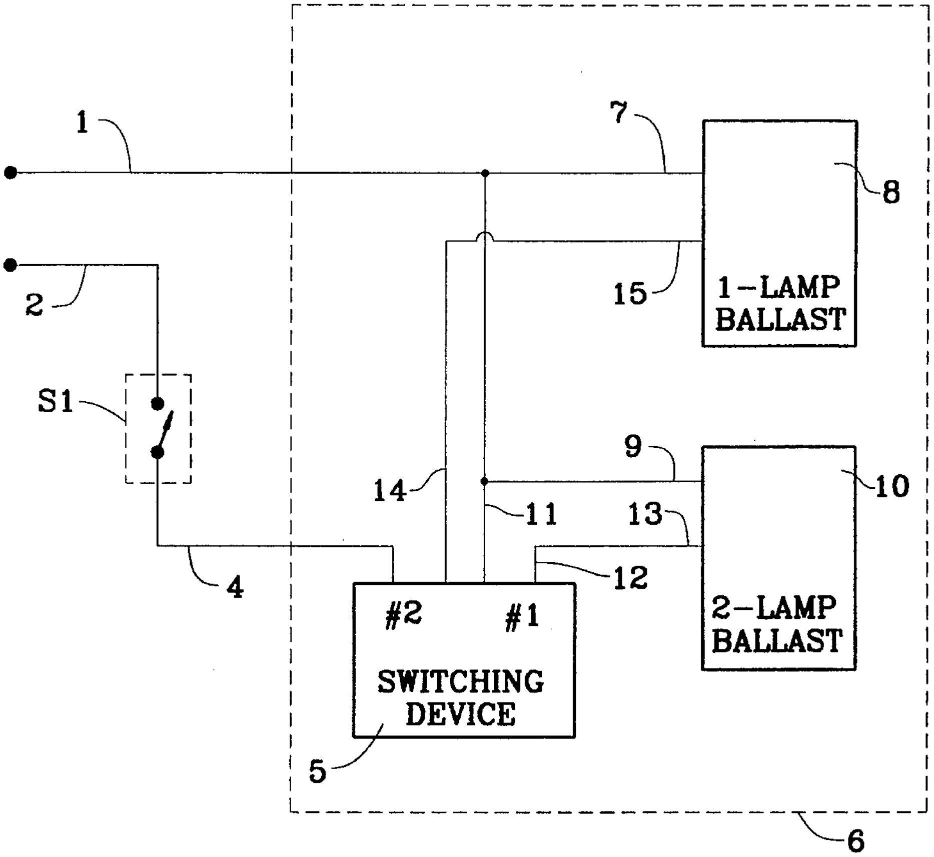
FIG. 1 is a block diagram, and illustrates the electrical hook-up of the universal electronic switching device of the present invention.

The U.S. Department of Energy and numerous public utility companies have confirmed, on several occasions, that the amount of energy consumed for lighting of residential, commercial and industrial buildings accounts for a substantial portion of all energy consumption. To emphasize the need to conserve energy in lighting systems, many public utilities offer rebate programs to compensate for the cost of installing energy efficient lighting products; and the U.S. Department of Energy sponsors an annual National Awards Program for Energy Innovation with a special section devoted solely to lighting products.

As a means of reducing energy consumption and related cost it has become a common practice by building managers to operate 4-Lamp fluorescent light fixtures with two of the fluorescent lamps removed. Although this practice reduces the light output it does provide a way of reducing operating cost without rewiring or replacing each light fixture. Manufactures of lighting fixtures have addressed the problem by providing 3-Lamp fluorescent fixtures with reflective inserts to compensate for the reduced light output when compared to standard 4-Lamp fixtures.

The state of California now enforces a mandated regulation under the California Code of Regulations, Title 24, Part 1, Identification No. P400-92-001, Section 131(b), pages 5–7 and 5–8 that requires each room in commercial lighting installations to include Bi-Level manual switching, enabling the lighting load to be reduced by at least 50% in a reasonably uniform illumination pattern. The intent of this requirement is to achieve the reduction without losing use of any part of the space. Methods of complying with the requirement include providing dimming controls (which require expensive "dimming" ballasts), or separate wall switches for each light fixture, or switching system that manually operate half (or less) of the fluorescent lamps in each light fixture. Historically, energy conserving measures and equipment introduced in California have been adopted by other states and federal agencies. Due to the energy efficiency of such provisions and the reduced cost of operation that it yields, it is anticipated that similar measures will be adopted elsewhere.

Previous devices that switched fluorescent lamps using one wall switch have not been successful for one or more of the following reasons: installation was difficult without completely rewiring each light fixture; models were not available for all the voltages used in the lighting industry; "False" switching often occurred due to voltage spikes (transients) on the A.C. power source; models were not available for both 3-Lamp and 4-Lamp fixtures; physical size prevented installation inside fluorescent fixtures; available units could not be used with both electronic and magnetic ballasts, and could not be used to activate related lighting equipment, such as motorized lighting controls or relays, and error switching occurred when units were wired parallel in an attempt to obtain simultaneous operation of a group of fluorescent fixtures.

The present invention was thus developed to overcome the previously mentioned problems while providing a reliable, low cost, switching device capable of controlling multiple lighting and equipment loads through a common pair of electrical transmission wires using a serially connected wall switch.

Referring now specifically to the drawings, FIG. 1 illustrates the electrical hook-up of the preferred universal electronic switching device 5 (hereinafter simply referred to as the "switching device") to a standard 3-Lamp fluorescent light fixture. A typical two conductor A.C. power source is depicted by a neutral conductor 1 and a hot conductor 2 with the latter being serially connected through a wall switch S1 to a conductor 4 which is the A.C. hot input wire to the switching device 5. Typically the wall switch S1 will be located some distance from the switching device 5 which, in the preferred embodiment, is mounted inside a fluorescent light fixture 6. The neutral conductor 1 is parallel connected to an A.C. neutral input wire 7 of a 1-Lamp ballast 8 and to an A.C. neutral input wire 9 of a 2-Lamp ballast 10 and to an A.C. neutral input wire 11 of the switching device 5. A #1 output wire 12 of the switching device 5 is connected to an A.C. hot input wire 13 of the 2-Lamp ballast 10 and a #2 output wire 14 of the switching device 5 is connected to the A.C. hot input wire 15 of the 1-Lamp ballast 8. The outputs of ballasts 8 and 10 are appropriately connected to their respective fluorescent lamps inside the fluorescent lamp fixture 6. The switching device 5 will operate on all lighting voltages including 120 vac, 220 vac, 277 vac and 347 vac. It is therefore necessary to make certain that the input A.C. voltage measured across conductors 1 and 2 matches the input voltage rating of ballast 8 across input wires 7 and 15, and ballast 10 across input wires 9 and 13. The switching device 5 includes electronically controllable power switches that selectively complete circuits between the A.C. hot wire 4 and either or both A.C. hot input wires 13 and 15 of ballasts 10 and 8, respectively in a predetermined pattern that activates both ballasts 8 and 10 thereby igniting all three fluorescent lamps in light fixture 6 upon the first activation of switch S1 and then sequentially activates only ballast 10 thereby igniting its respective two fluorescent lamps when switch S1 is turned off and then back on a second time; followed by the activation of ballast 8 only thus igniting its respective fluorescent lamp when switch S1 is turned off and then back on a third time; thereby providing a means of selectively controlling three different modes of operation by toggling switch S1 the correct number of times to obtain the desired amount of light.

Figure 2A:
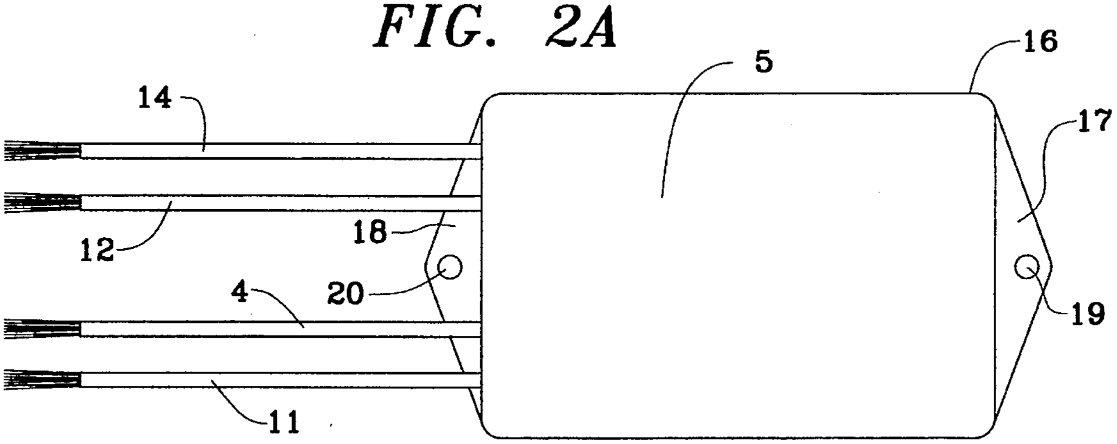
FIGS. 2A, 2B and 2C are top plan, side elevational and end elevational views respectively, of a housing of the present invention.

In its preferred embodiment, a housing (FIGS. 2A–2C) for switching device 5 is a plastic case 16 with an open bottom and integral mounting flanges 17 and 18 protruding from the case 16 at its lowermost portion (numbered). Each mounting flange 17 and 18 contains centrally located mounting holes 19 and 20, respectively, to provide a means for mounting switching device 5 by using appropriately sized fasteners (not shown). Wires 4 and 11 comprise the A.C. inputs to switching device 5, while wires 12 and 14 are the respective outputs #1 and #2. Each wire protrudes from case 16 to provide adequate clearance when making electrical connections.

Figure 2C:
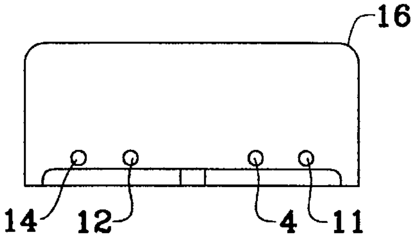
Figure 2B:
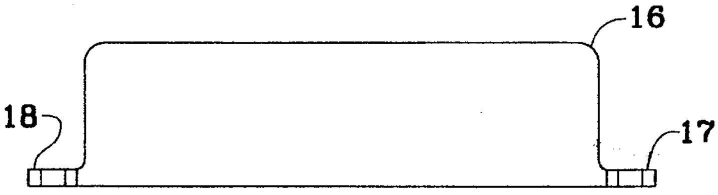

FIG. 2B shows the location of the integral mounting flanges 17 and 18 with respect to case 16. FIG. 2C illustrates the locations at which the wires 4, 11, 12, and 14 protrude from the case 16. In the preferred embodiment the overall dimensions of case 16 are 3.875 inches long by 1.500 inches high by 2.000 inches wide although it should be understood that other size cases may be used without affecting the operation of switching device 5. In its fully assembled form, the internal circuitry of the preferred switching device 5 is totally encapsulated inside case 16 with epoxy potting compound to provide total electrical insulation.

Figure 3:
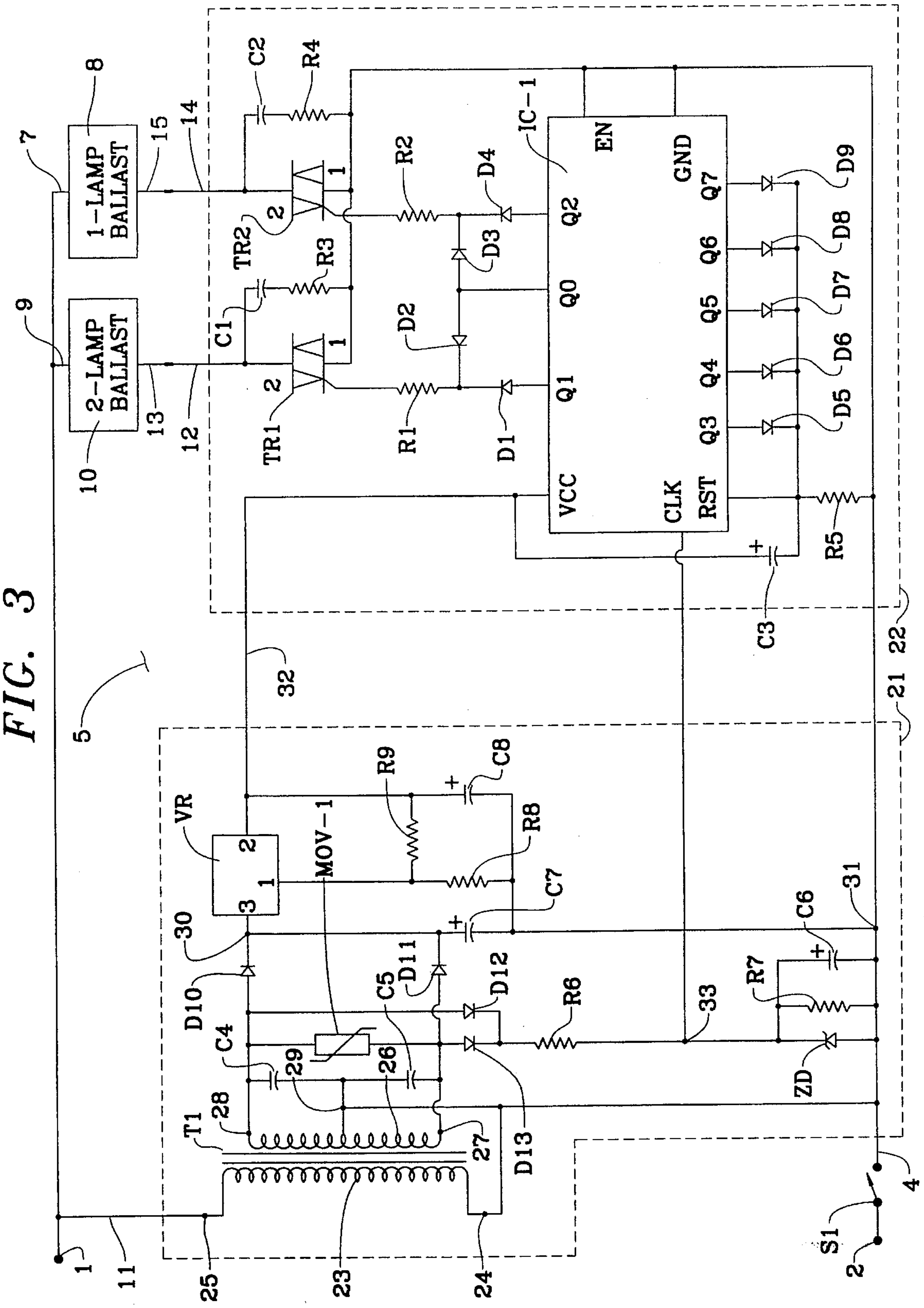
FIG. 3 is a schematic diagram of a preferred circuitry of the present invention.

In FIG. 3 the switching device 5 is shown in two sections for easy reference. A power supply section 21 is designated by the dashed area 21 and a logic control section 22 is designated by the dashed area 22. Referring to the power supply section 21, the preferred switching device 5 employs a step-down transformer T1 comprised of a primary winding 23 located between terminals 24 and 25 in conjunction with a secondary winding 26 located between terminals 27 and 28. A center point of the secondary winding 26 is accessible at a terminal 29 thereby providing a center-tap connection point. The primary winding 23 of transformer T1 is rated at 350 vac while the secondary winding 26 of transformer T1 is rated at 36 vac between terminals 27 and 28. The center-tap terminal 29 of secondary winding 26 is connected to one end of the primary winding 23 at terminal 24 which is also connected to switch S1 through wire 4. The remaining end of primary winding 23 of transformer T1 is connected from terminal 25 to the A.C. neutral power source conductor 1 through wire 11. One lead of each of two 0.1 ufd/63 v capacitors C4 and C5 is connected to the center-tap terminal 29 with a remaining lead of capacitor C4 connected to terminal 28 and a remaining lead of capacitor C5 connected to terminal 27. Metal oxide varistor MOV-1, rated at 75 v, is connected between terminals 27 and 28 across the full secondary winding 26 of transformer T1. Rectifiers D10 and D11 are standard 1N4001 types with their cathodes connected together at node 30. The anode of rectifier D10 is connected to one end of the secondary winding 26 at terminal 28 while the anode of rectifier D11 is connected to the remaining end of secondary winding 26 at terminal 27. Capacitor C7, rated 2200 ufd/35 vdc, is included in the circuit with the positive lead connected to node 30 and the negative lead connected to node 31, thereby making node 31 a common reference point that is electrically common to wire 4. The resulting circuit configuration forms a full wave, center-tapped, unregulated D.C. power supply that generates a positive D.C. voltage at node 30 in direct proportion to the level of A.C. voltage across the primary winding 23 of transformer T1. The secondary center-tap 29 of transformer T1 establishes the negative reference point for the D.C. voltage at node 31 through a common connection to wire 4. Capacitors C4 and C5 in combination with metal oxide varistor MOV-1 substantially reduce the possibility of transient voltage spikes in the A.C. power source from passing through the unregulated D.C. power supply to node 30. Node 30 supplies a positive D.C. voltage to input pin 3 of adjustable positive voltage regulator VR which is a common type LM317. (Hereinafter the adjustable positive voltage regulator win be referred to simply as "the regulator" VR). An output pin 2 of regulator VR is connected to an adjustment pin 1 of the regulator VR through a 120-ohm resistor R9 to maintain enough internal current to drive the regulator VR into the regulation mode. A 620-ohm resistor R8 is connected between the adjustment pin 1 of regulator VR and the common reference point node 31 to set the output voltage of the regulator VR at a substantially constant 75 vdc at node 32. Capacitor C8, rated 1,000 ufd/10 vdc, has its positive lead connected to pin 2 of regulator VR at node 32, and its negative lead connected to the common reference point node 31 to filter the regulated +7.5 vdc output voltage. The regulator VR has a rated input/output differential voltage of 40 volts meaning that the output voltage determined by the value of resistor R8 will remain in regulation as loug as the input voltage at pin 3 of regulator VR does not exceed the output voltage at pin 2 of regulator VR by more than 40 volts. Remembering that the transformer T1 has a primary voltage rating of 350 vac across primary 23; assume that the switching device 5 is operating from a 120 vac power source connected to conductors 1 and 2. Transformer T1 will produce a lower than rated A.C. output voltage across its secondary winding 26 that, when rectified by rectifiers D10 and D11, and filtered by capacitor C7 will generate an unregulated D.C. voltage of approximately +8.0 vdc to the input pin 3 of regulator VR, thereby establishing an input/output differential voltage of 0.5 vdc while maintaining a regulated output voltage of +7.5 vdc. Now, assuming that the A.C. power source at conductors 1 and 2 is changed to 350 vac, the A.C. output voltage across secondary winding 26 will be a higher value resulting in an unregulated D.C. voltage of approximately +23.0 vdc to the input pin 3 of regulator VR, thereby establishing an input/output differential voltage of +155 vdc while maintaining a regulated output voltage of +7.5 vdc. In both cases the input/output differential voltage does not exceed the limitations of regulator VR yet a constant output voltage of +7.5 vdc is always maintained at node 32 to supply power to the logic control section 22 of the switching device 5. It is by this means that the switching device 5 is capable of operating universally on all A.C. input voltages from 120 vac to 350 vac.

The power supply section 21 of switching device 5 also contains circuitry that comprises a voltage supply interrupt detector by detecting an interruption in the A.C. power source and converting it into a voltage supply interrupt detected signal which is sent to the logic control section 22 for processing. The A.C. interrupt detection circuit is comprised of two 1N4001 rectifiers D12 and D13 with their anodes connected respectively to terminals 28 and 27 of the secondary winding 26 of transformer T1. The cathodes of rectifiers D12 and D13 are connected together to one end of a 430-ohm resistor R6. The other end of resistor R6 is serially connected through a 10 K-ohm resistor R7 to the common reference point node 31. The intersection point of serially connected resistors R6 and R7 is defined as node 33 and provides an output means for the A.C. interrupt detection signal. Connected parallel across resistor R7 is a 62 v zener diode ZD and a 4.7 ufd/10 vdc capacitor C6 with the positive lead of capacitor C6 connected to the cathode of zener diode ZD. The A.C. interrupt detection circuitry operates by converting the A.C. voltage across secondary winding 26 of transformer T1 into a positive D.C. voltage of 62 vdc whenever A.C. source voltage is applied to the primary winding 23 of transformer T1. The rate of rise and fall of the voltage at node 33 in relation to the regulated voltage at node 32 is used to generate an interrupt detection signal that causes the logic control section 22 to switch to the next selected state. Zener diode ZD limits the charge on capacitor C6 to a maximum of +62 vdc which occurs very rapidly when the A.C. source voltage is supplied through switch S1 to the primary winding 23 of transformer T1. When switch S1 is briefly opened and then closed, momentarily interrupting the A.C. power source, the voltage on capacitor C6 rapidly discharges through resistor R7 and then recharges causing a positive voltage pulse (interrupt detection signal) to appear at node 33. Since capacitors C7 and C8 are much larger values than capacitor C6 and thus take much longer to discharge, the regulated voltage at node 32, which supplies power to the logic control section 22, is unaffected by the brief interruption in the A.C. power source; thus allowing the positive pulse generated at node 33 to be accepted by the logic control section 22 as a valid signal.

Referring now to FIG. 3, the logic control section 22 of the switching device 5 obtains its operating voltage from power supply section 21 through connections to nodes 31 and 32. The switching device 5 uses a single digital counter IC-1 to perform all the switching functions in logic control section 22. Counter IC-1 is a standard octal counter, part no. 4022, that activates one of eight outputs causing them to go "High", one at a time, in sequence whenever it receives a positive pulse on a clock input pin CLK. Counter IC-1 is connected with an enable input pin EN and a ground pin GND both connected to the common reference point node 31. A positive input pin VCC of counter IC-1 is connected to node 32 to receive +75 vdc from the power supply section 21 as its source of positive source operating voltage. The anodes of 1N914 switching diodes D5 through D9 are each connected to output pins Q3 through Q7 respectively of counter IC-1. The cathodes of switching diodes D5 through 139 are connected together to a reset input pin RST of counter IC-1. A 10 K-ohm resistor R5 is connected between the reset input pin RST of counter IC-1 and the common reference point node 31. The negative lead of capacitor C3, rated 4.7 ufd/10 vdc, is connected to the reset input pin RST of counter IC-1 and the positive lead of capacitor C3 is connected to the VCC input pin of counter IC-1. In the preferred embodiment, output pin Q3 of counter IC-1 preforms a reset function as an integral part of the switching pattern, whereas output pins Q4 through Q7 of counter IC-1 merely provide an extra measure of safety to guarantee that counter IC-1 always starts out in the reset mode during start-up. Upon initial activation of the switching device 5 the reset input pin RST of counter IC-1 goes "High" until capacitor C3 charges to one half the voltage level at node 32 through resistor R5, whereupon the logic state of the reset input pin RST returns to the "Lo" logic state. This action causes the switching device 5 to automatically reset upon initial activation setting the output pin Q0 "High" and output pins Q1 through Q7 "Lows" Switching diodes D1 through D4 are common 1N914 types that are used to route output signals in a predetermined pattern. In the preferred embodiment, the anode of diode D1 is connected to the Q1 output pin of counter IC-1 and the cathode of D1 is serially connected through a 1.3 K-ohm resistor R1 to the control gate of an active driver device fin this embodiment, triac TR1). In a similar manner the anode of diode D4 is connected to the Q2 output pin of counter IC-1 and the cathode of D4 is serially connected through a 13 K-ohm resistor R2 to the gate of triac TR2. The anodes of diodes D2 and D3 are connected to the Q0 output pin of counter IC-1 with the cathode of diode 132 connected to the intersection point between serially connected diode D1 and resistor R1. In a similar manner the cathode of diode D3 is connected to the intersection point between serially connected diode D4 and resistor R2. The circuit comprised of diodes D1 through D4 in combination with resistors R1 and R2 provides a means of routing signals from the output pins Q0, Q1, and Q2 of counter IC-1 to the gates of triacs TR1 and TR2. The number 1 terminal of both triacs TR1 and TR2 are connected together to the common reference node 31. Both triacs TR1 and TR2 are type 2N6073. In the preferred embodiment terminal number 2 of triac TR1 is connected through wire 12 to the input wire 13 of 2-Lamp ballast 10, with the remaining input wire 9 of ballast 10 connected to the neutral side of the A.C. power source conductor 1. Likewise, terminal number 2 of triac TR2 is connected through wire 14 to the input wire 15 of 1-Lamp ballast 8, with the remaining input wire 7 of ballast 8 connected to the neutral side of the A.C. power source conductor 1. A R/C snubber circuit comprised of series connected capacitor C1 and resistor R3 is connected across triac TR1 with resistor R3 connected to terminal number 1 of triac TR1 and capacitor C1 connected to terminal number 2 of triac TR1. The same circuit configuration for a R/C snubber circuit is connected to triac TR2 with one end of capacitor C2 connected to terminal 2 of triac TR2 and the other end of capacitor C2 serially connected through resistor R4 to terminal number 1 of triac TR2 the value selected for capacitors C1 and C2 is 0.01 ufd/630 v while the value selected for resistors R3 and R4 is 39-ohms each. The snubber circuits across triacs TR1 and TR2 help prevent damage to triacs TR1 and TR2 when they are switched on or off at a point in the A.C. sine wave that would normally cause internal damage. In the preferred embodiment octal counter IC-1 goes into the reset state upon initial activation of switching device 5 when switch S1 is first closed. In the reset mode output pin Q0 of IC-1 is "High" and output pins Q1 and Q2 are "Low". The output pin Q0 provides a signal through diode D2 and resistor R1 to the gate of triac TR1 thereby turning on triac TR1. At the same time, the same signal from output pin Q0 of IC-1 is applied through diode D3 and resistor R2 to the gate of triac TR2 thereby turning on triac TR2. As a result when the preferred switching device 5 is first activated by the closure of switch S1 both fluorescent lamp ballasts will be activated igniting all three lamps in the fluorescent fixture. When the A.C. power source is briefly interrupted by opening and closing switch S1, (regardless of how much time has passed since power was initially applied) the positive pulse interrupt detection signal generated at node 33 is passed to the clock input pin CLK of IC-1 causing IC-1 to switch to the next internal counter stage thus causing output pin Q0 of IC-1 to go "Low" and output pin Q1 of IC-1 to go "High". The output pin Q1 of IC-1 provides a signal through diode D1 and resistor R1 to the gate of triac TR1 only which activates the 2-Lamp ballast 10 igniting two of the lamps in the fluorescent fixture. When switch S1 is momentarily interrupted again, (and, again regardless of how much time has passed since the previous brief interruption) output pin Q1 of IC-1 goes "Low" and output pin Q2 of IC-1 goes "High" sending a signal through diode D4 and resistor R2 to the gate of triac TR2 which supplies power to the 1-Lamp ballast 8 thus igniting only one fluorescent lamp in the fixture. If switch S1 is momentarily interrupted again, output pin Q2 of IC-1 goes "Low" and output pin Q3 goes "High", however, output pin Q3 is connected to the reset input pin RST of IC-1 through diode D5 causing IC-1 to immediately go back to the reset state with the output pin Q0 "High" and output pins Q1 and Q2 "Low" thereby beginning the pattern of operation again.

During the normal course of operation of the switching device 5 transient voltage spikes may appear at the A.C. source conductors 1 and 2 which could affect the operation of the octal counter IC-1. To prevent false operations caused by transient voltage spikes capacitors CA and C5 in combination with MOV-1 in the power supply section 21 shunt the voltage spikes thereby preventing them from being transferred to the octal counter IC-1 through the positive voltage supply line 32.

Several switching devices 5 may be used together to operate many 3-Lamp fluorescent fixtures by connecting the power input leads 4 and 11 of each switching device in parallel thus operating several switching devices 5 through one wall switch S1. In this configuration it is possible for some of the fluorescent fixtures equipped with switching devices 5 to become "out of sequence", meaning that the same number of fluorescent lamps are not lit in all the fixtures, by intentionally toggling wall switch S1 at a rate too fast to allow the internal circuits of switching device 5 to function correctly. In this instance, all switching devices 5 may be reset to their initial starting point (3 lamps lit) by simply turning the wall switch S1 OFF, and leaving it in the OFF position for approximately 20 seconds, thereby allowing enough time for capacitor C3 to discharge which will generate a reset signal to reset pin RST of IC-1 when switch S1 is turned back on.

Figure 4:
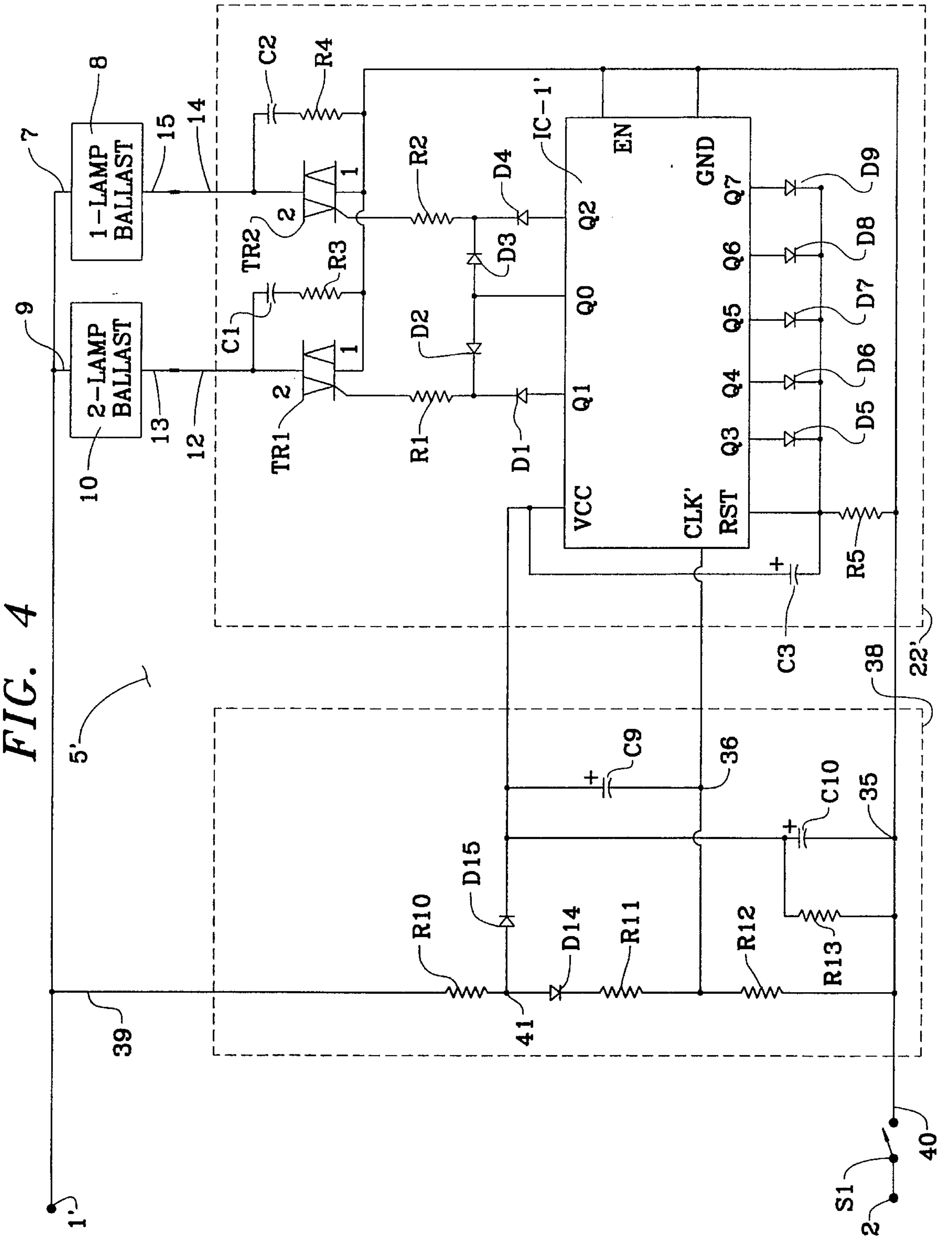
FIG. 4 is a schematic diagram of a second embodiment of the present invention and illustrates a simplified power supply means.

FIG. 4 illustrates a second embodiment of the invention in which a switching device 5' has a power supply section 38, which replaces the power supply section 21 of the switching device 5 shown in FIG. 3. All remaining portions of the logic control section 22' remain exactly the same in construction and operation as shown and heretofore described relative to FIG. 3. It should be noted that universal operation of switching device 5 is retained in the switching device 5' when power supply section 38 is substituted for power supply section 21. The power supply section 38 in FIG. 4 serves as a means of simplifying the construction of the switching device 5'. One lead of a 6.8 K-ohm 10-watt resistor R10 connects to a wire 39 becoming the neutral A.C. input wire to switching device 5' which is externally connected to a neutral side of the A.C. power source conductor 1'. The remaining lead of resistor R10 is connected to the anode of a 1N4004 rectifier D14 and then serially connected through two resistors, the first being 430-ohm resistor R11 and the second being 27 K-ohm resistor R12, to common reference point node 35 (which corresponds to node 31 in FIG. 3). The common reference point node 35 is also connected to a wire 40 which becomes the "hot" input wire to switching device 5'. Connected to an intersection point 41 between series connected resistor R10 and rectifier D14 is the anode of a 1N4004 rectifier D15 whose cathode is connected to a conductor 37. The positive lead of a 220 ufd/25 vdc capacitor C10 is connected to conductor 37 with the negative lead of the same capacitor connected to the common reference point node 35. A 15 K-ohm resistor R13 is connected parallel across capacitor C10. The positive lead of a 4.7 ufd/16 vdc capacitor C9 is connected to conductor 37 with the negative lead of capacitor C9 connected to node 36 which is also connected to the intersection point between serially connected resistors R11 and R12. In this circuit configuration resistor R10 working in conjunction with rectifier D15 and resistor R13 establishes a voltage divider network that generates approximately +8.0 vdc at conductor 37 when referenced to the common reference point node 35. This divider network constitutes a half wave D.C. power supply that is filtered by capacitor C10. The output generated through conductor 37 supplies positive D.C. power to the logic control section 22' to the VCC input pin of counter IC-1'. Another voltage divider network that interacts with the previously described voltage divider network 22 is comprised of the serially connected components R10, D14, R11 and R12; to provide a reduced voltage at node 36 that will not rise above +8.0 vdc during operation. The voltage created at node 36 upon activation of switching device 5' serves as the A.C. voltage interrupt detection means to supply a positive pulse to the clock input pin CLK of counter IC-1', Capacitor C9 connected between node 36 and conductor 37 prevents transient voltage spikes that may occur across either of the voltage divider networks from creating a false clock pulse to the clock input pin CLK of counter IC-1, thus providing a means of eliminating false operation of a group of switching devices 5' when wired in parallel. In this simplified power supply section 38 the value of only one component, resistor R10, needs to be changed to accommodate the full range of lighting voltages with all other component parts in power supply section 38 remaining exactly the same. For operation at 120 vac R10 should be 6.8 K-ohms; for operation at 220 vac R10 should be 13.6 K-ohms; for operation at 277 vac R10 should be 17 K-ohms and for operation at 347 vac R10 should be 20 K-ohms; thereby providing a means of operating switching device 5' utilizing the simplified power supply section 38 for all standard voltages used in lighting applications.

Figure 5:
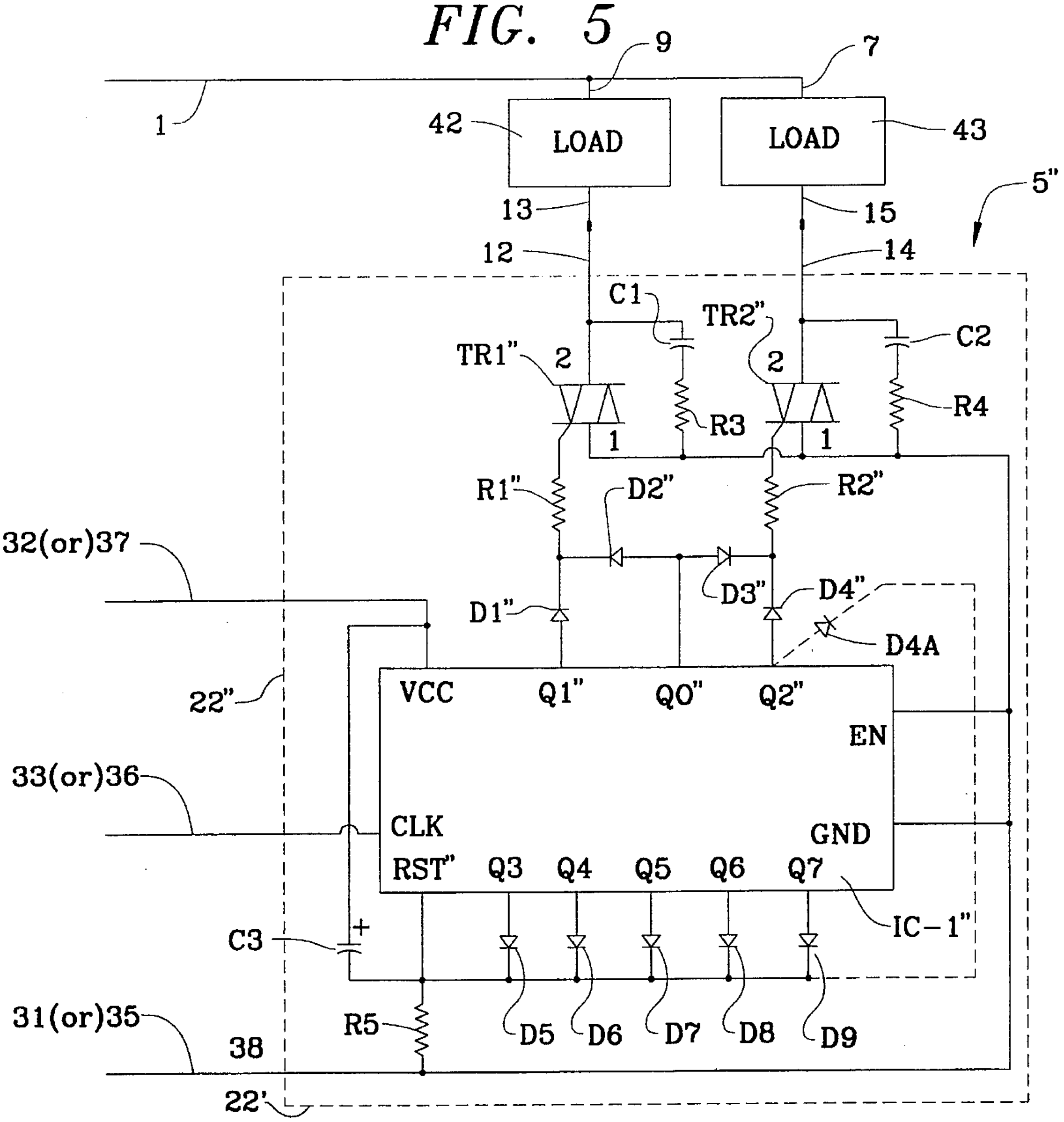
FIG. 5 is a schematic diagram of a third embodiment of the present invention, and illustrates means for operating both 3-Lamp and 4-Lamp fixtures.

FIG. 5 depicts a third embodiment of a switching device 5' wherein the logic control section 22" is adapted to operate both 3-Lamp and 4-Lamp fluorescent light fixtures. As previously disclosed, the preferred embodiment of the switching device 5 is configured to energize fluorescent lamps in a 3-Lamp fixture using a descending 3-step pattern to energize one 1-Lamp ballast or one 2-Lamp ballast or both ballasts at the same time. 4-Lamp fluorescent fixtures require a different pattern of operation because each fixture contains two 2-Lamp ballast, thus eliminating the possibility of igniting a single fluorescent lamp. As a result the only available means of reducing the energy consumed in 4-Lamp fixtures through direct switching is to energize one of the 2-Lamp ballast or both of the 2-Lamp ballast thus requiring only a 2-step pattern of operation. Converting the logic control section 22" to switch in a 2-step pattern instead of the 3-step pattern described in the preferred embodiment is accomplished by a simple juxtaposition of one component part. Referring now to FIG. 5, which uses designation numbers corresponding to previous Figures indicating the compatibility of logic control section 22" with either power supply section 21 or 38. The output pin Q0" of octal counter IC-1" activates triacs TR1" and/or TR2" through a group of switching diodes D1" through D4" serially connected to the gate leads through resistors R1" and/or R2". In the 3-step configuration of the preferred embodiment triac TR1" is activated through serially connected diode D2" and resistor R1": and triac TR2" is activated through serially connected diode D3" and resistor R2" when the switching device is initially turned on, thus constituting the first step of operation. The second step of operation occurs when the output pin Q0" of counter IC-1" goes "Low" and the output pin Q1" goes "High" supplying a signal to the gate of triac TR1" only through serially connected diode D1" and resistor R1". These first two steps of operation are identical in all embodiments of the invention. The third step of operation distinguishes the differences between the first embodiment and this embodiment. The third step of operation occurs when output pin Q1" of counter IC-1" goes "Low" and output pin Q2" goes "High". In the first embodiment of the switching device 5 triac TR2 is activated through serially connected diode D4 and resistor R2. In this embodiment of switching device 5" diode D4 is redefined as diode D4A with its cathode lead connected to a reset input pin RST" of counter IC-1" instead of R2, as illustrated by dashed lines, thus directing the signal from output pin Q2" of counter IC-1" to the reset pin RST" of counter IC-1". This causes counter IC-1" to immediately reset back to its zero starting point with output pin Q0" "High" and output pins Q1" and Q2" "Low" which prevents the third step of operation from individually activating triac TR2".

Figure 6A:
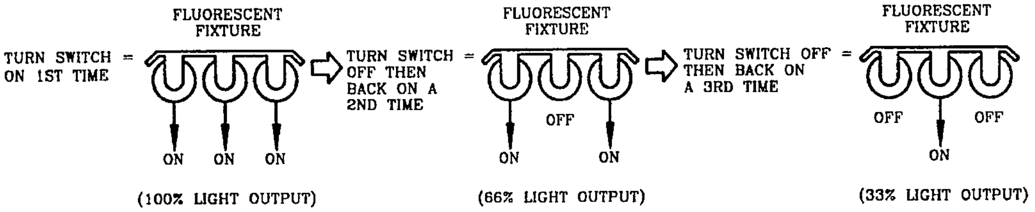
FIG. 6A and 6B illustrate the operation of the circuits shown in FIG. 5 by selective switch manipulation.
Figure 6B:
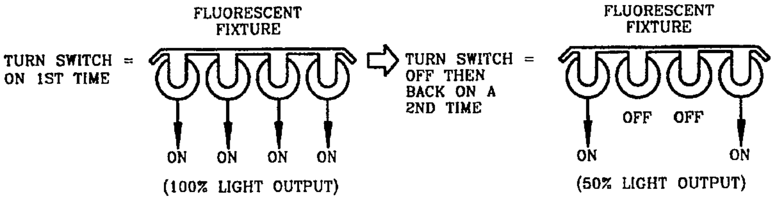

Triacs TR1" and TR2" are used to energize fluorescent ballasts but the types of ballasts they control will differ depending upon the type of light fixture used. The switching device 5 accommodates 3-Lamp fixtures where load 10 is a 2-Lamp ballast and load 8 is a 1-Lamp ballast operating in a descending 3-step pattern to produce different light outputs of 100%, 66% or 33%, as shown in FIG. 6A. The embodiment of the switching device 5" accommodates 4-Lamp fixtures where loads 42 and 43 are both 2-Lamp ballasts operating in a descending 2-step pattern to produce light outputs of 100% or 50%, as shown in FIG. 6B. Thus, the logic control circuit 22 or 22" is made to switch in either a 2-step pattern or a 3-step pattern by simply connecting the cathode lead of diode D4 (D4A) to a different point in the circuit.

Figures 7, 8:
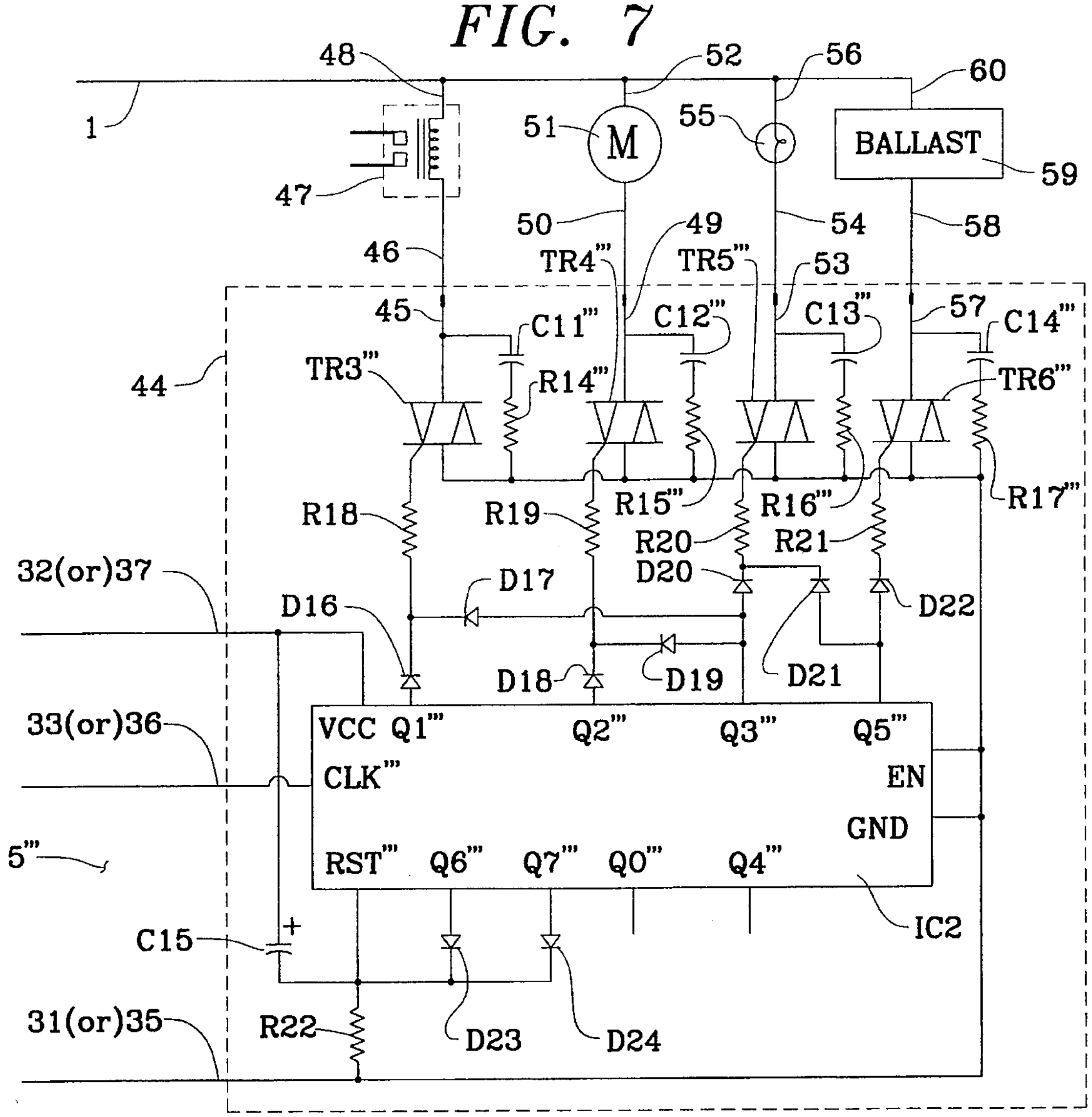
FIG. 7 is a schematic diagram of a fourth embodiment of the present invention, and illustrates circuitry capable of activating various loads in various patterns of operation.
FIG. 8 is an operation chart and list the sequence of operation of the various circuits shown in FIG. 7.

FIG. 7 depicts a fourth embodiment of a switching device 5''' containing a logic control section adapted to activate a variety of multiple loads in various patterns of operation. The illustration is intended to demonstrate the versatility of the switching device 5''' within the limits of the defined circuit configuration. Referring now to FIG. 7 showing the logic control section 44 which is capable of being powered by either power supply section 21 or 38 as denoted by reference to their respective conductor connections. Counter IC-2 may be either an octal counter (8 steps) such as a 4022 or a decade counter (10 steps) such as a 4017 depending upon application requirements. In this example, counter IC-2 is shown as an octal counter utilizing the same power supply and clock connections as previously described, with the only differences being the interconnections between its output circuits. This example utilizes four loads for illustration purposes only recognizing that eight loads could be accommodated using a 4022 as counter IC-2 (or up to 10 loads if counter IC-2 was a 4017 decade counter). The loads have been selected to exemplify lighting equipment normally associated with commercial applications.

Each load is energized by its respective triac. The output terminal 45 of triac TR3''' is connected to the input terminal 46 of relay 47 with the remaining relay terminal 48 connected to conductor 1. An output terminal 49 of triac TR4''' is connected to the input terminal 50 of motor 51 with the remaining motor terminal 52 connected to conductor 1. The output terminal 53 of triac TR5''' is connected to the input terminal 54 of incandescent lamp 55 with the remaining lamp terminal 56 connected to conductor 1. The output terminal 57 of triac TR6''' is connected to input terminal 58 of fluorescent ballast 59 with the remaining ballast terminal 60 connected to conductor 1. When activated each triac will energize its respective load through a common connection to conductor 31 (or 35). Each triac has a snubber circuit, consisting of a capacitor serially connected through a resistor with the combination circuit wired parallel across the terminals of the triac. The snubber circuits for triacs TR3''' through TR6''' include respective capacitors C11''' through C14''' and respective resistors R14''' through R17''', with each capacitor being rated at 0.01 ufd/630 v and each resistor being rated at 39-ohms. The switching pattern and selection of individual and parallel loads shown in logic control section 44 represents only one circuit configuration; among the hundreds of combinations that are possible. By simply rearranging switching diodes D16 through D22 completely different patterns and load combinations may be obtained using the exact same counter IC-2 and the exact same output circuits thereby providing multiple functions using identical component parts.

The switching diodes D16 through D22 determine the signal path from the output pins of counter IC-2 to the gate terminals of triacs TR3''' through TR6'''. Since the switching diodes D16 through D22 will only pass D.C. current in one direction they are used to either pass or block control signals through serially connected resistors R18 through R21 to triacs TR3''' through TR6'''. When the device is first turned on the reset pin RST''' off counter IC-2 goes "High" in response to the charging of capacitor C15''' through resistor R22 as previously described in prior embodiments. This causes output pin Q0''' of counter IC-2 to goes "High" until counter IC-2 receives a clock signal at pin CLK'''. In this example the output pin Q0''' off counter IC-2 is not connected, thus none of the loads are energized in the first step of operation. When a clock signal arrives at clock input pin CLK''' of counter IC-2 the output pin Q0''' goes "Low" and the output pin Q1''' goes "High" sending a signal through serially connected diode D16 and resistor R18 to the gate terminal of triac TR3''' which activates relay 47. Upon the arrival of the next clock signal output pin Q1''' goes "Low" removing the signal from the gate of triac TR3''' which turns off the relay and output pin Q2''' goes "High" sending a signal through serially connected diode D18 and resistor R19 to the gate of triac TR4''' which activates motor 51. When the next clock signal arrives output pin Q2''' goes "Low" removing the signal from the gate of triac TR4''' and output pin Q3''' goes "High" sending a signal to the relay 47 through serially connected diode D17 and resistor R18 to the gate of triac TR3''' turning the relay 47 back on; and at the same time directing the same signal through serially connected diode D19 and resistor R19 to the gate of triac TR4''' thereby maintaining the operation of motor 51 and at the same time, directing the same signal through serially connected diode D20 and resistor R20 to the gate of triac TR5''' thereby activating incandescent lamp 55. Thus it can be seen that by using diodes D17, D19 and D20 to direct the signal from output pin Q3''' of counter IC-2 it is possible to activate three different loads (relay 47, motor 51 and lamp 55). The next signal arriving at the clock input pin CLK''' of counter IC-2 causes output pin Q3''' to go "Low" which removes the gate signal from triacs TR3''', TR4''' and TR5''' turning off relay 47, motor 51 and lamp 55, while output pin Q4''' goes "High". Since output pin Q4''' is not connected this step in the pattern is intended to provide a period when none of the loads are activated. The next signal arriving at the clock input pin CLK''' of counter IC-2 causes output pin Q4''' to go "Low" and output pin QS''' to go "High" sending a signal through serially connected diode D21 and resistor R20 to the gate of triac TR5''' thereby turning the lamp 55 back on, and at the same time directing the same signal through serially connected diode D22 and resistor R21 to the gate of triac TR6''' activating fluorescent ballast 59. Upon arrival of the next signal to the clock input pin CLK''' of counter IC-2 output pin Q5''' goes "Low" and output pin Q6''' goes "High" just long enough to deliver the signal to the reset input pin RST" of counter IC-2 through diode D23 which immediately resets counter IC-2 back to its zero starting point with output pin Q0''' "High" and all other output pins "Low", whereupon the pattern of operation may start over again. In this example, output pin Q7''' of counter IC-2 never goes "High" because counter IC-2 is reset before reaching the Q7''' stage of the internal counter. FIG. 8 shows an operation chart of this latter embodiment of the invention listing each stage of operation as previously described.

While the present invention has been illustrated in considerable detail, it will be apparent to those skilled in the art that numerous changes may be made without departing from the scope of the present invention as defined in the appended claims.

What is claimed is:

1. A universal control circuit operable on A.C. source voltages from 120 vac to 350 vac for use with a serially connected power switch through a single conductor to a plurality of loads, each having a voltage rating equal to said A.C. source voltage within said range of operable voltages, said control circuit comprising;

(a) means for selectively applying and removing electrical power from the A.C. source to said loads in a predetermined pattern of operation, responsive to successive opening and closing of said power switch, said means for selectively applying and removing electrical power including a plurality of gate controlled thyristors;

(b) connection means for coupling said loads in series with said A.C. source through said thyristors;

(c) circuit means for detecting an interruption in said A.C. source voltage and for selectively energizing said loads through said thyristors;

(d) logic circuit means utilizing a digital counter to provide selective activation of said thyristors;

(e) power supply means to convert said A.C. source voltage into a D.C. low voltage sufficient to operate said logic circuit means, said D.C. low voltage being regulated to a constant output voltage over a range of said A.C. source voltages;

(f) reset means to automatically reset said predetermined pattern of operation to its original starting point following application of said A.C. source voltage after first removing said A.C. source voltage for a set period of time; and (g) diode circuit means connected between said digital counter and said plurality of gate controlled thyristors, said diode circuit means include a plurality of switching diodes that route at least one output of said digital counter to each one of said plurality of gate controlled thyristors.

2. The universal control circuit of claim 1, further including means for interrupting said A.C. source voltage, said interrupting means comprising a manually operable power switch or an electromechanical device located at any point in said A.C. source conductor between said A.C. source voltage and said universal control circuit.

3. The universal control circuit of claim 1, wherein said power supply means comprises transformer means and rectifier means in conjunction with filter capacitor means creating a full wave center-tap D.C. supply means coupled to a voltage regulator means thus providing a regulated low voltage D.C. supply source to power said logic circuits means.

4. The universal control circuit of claim 1, wherein said power supply means comprises voltage divider means and rectifier means in conjunction with filter capacitor means creating a half wave D.C. supply means supplying a relatively constant low voltage D.C. supply source to power said logic circuit means.

5. The universal control circuit of claim 1, wherein said control circuit incorporates said digital counter as the sole digital integrated circuit device used to accomplish said selective activation using said plurality of switching diodes through respective serially connected resistors to selectively supply gate signals directly to said thyristors thus controlling a plurality of respective loads.

6. The universal control circuit of claim 1, wherein said reset means provides a reset function upon initial start up by capacitive charging means and thereafter by switching said diode means connected between selected outputs of said digital counter to a reset input of said digital counter.

7. The universal control circuit of claim 1, wherein said diode means is selectively adapted to said digital counter means to produce either a 3-step switching pattern to accommodate ballasts loads of 3-Lamp fluorescent fixtures, or a 2-step switching pattern to accommodate ballasts loads of 4-Lamp fluorescent fixtures.

8. The universal control circuit of claim 1, wherein additional thyristors are added to the circuit as means for activating additional loads of various types in response to said diode means to produce a pattern of operation determined by said diode means.

9. The universal control circuit of claim 1 wherein all circuitry, excluding the external conductors for A.C. source voltage inputs and load outputs, is contained in a nonconductive plastic enclosure and totally encapsulated with epoxy potting compound.

10. A universal control circuit operable on A.C. source voltages from 120 vac to 350 vac for selectively supplying A.C. power to one or more load devices, each having a voltage rating equal to said A.C. source voltages within said range of operable voltages, under control of a single switch comprising:

a plurality of gate controllable thyristors serving as power switches each having external conductor means adapted for connection in series with one of said load devices, with the gates of said thyristors controlling conduction of said A.C. source voltages through said load devices;

power interruption detection means adapted to produce a low voltage control signal to advance digital counter means upon brief interruptions of said A.C. source voltages, said digital counter means producing a plurality of output signals, one at a time in sequence, upon receipt of said power interruption detection means control signal to a clock input of said digital counter means, said digital counter means being powered by a regulated D.C. voltage derived from said A.C. source voltages;

diode circuit means interconnected between said digital counter means through series resistor means to the gates of said thyristors to provide for activation of said thyristors in a predetermined pattern of operation thereby supplying A.C. power to the load devices connected thereto, said diode circuit means including a plurality of switching diodes that route at least one output of said digital counter to each of said plurality of gate controllable thyristors;

reset means to automatically reset said predetermined pattern of operation to its original starting point upon completion of said predetermined pattern and to also provide a reset signal upon initial connection to said A.C. source voltages to establish the starting point for said predetermined pattern of operation.

11. A universal control circuit comprising:

A) a power supply having:

an input coupled to a voltage supply that supplies any of a range of voltages;

an output that transforms and regulates said voltage supply to provide a relatively constant predetermined DC voltage over said range of voltage of said voltage supply; and a voltage supply interrupt detector that is operably coupled to the power supply input and that has a voltage supply interrupt detected signal output;

B) a logic circuit having:

a power input that is operably coupled to the power supply output;

a plurality of outputs; and a signal input that is operably coupled to the voltage supply interrupt detected signal output;

C) a plurality of active driver devices, wherein each active driver device has a power output and a control gate, wherein each control gate is operably coupled to a corresponding logic circuit output such that the logic circuit outputs are sequentially enabled in response to brief interruptions of the voltage supply to the power supply; and D) a diode circuit connected between said logic circuit and said plurality of active driver devices, said diode circuit including a plurality of switching diodes that route at least one of said plurality of logic circuit outputs to each of said plurality of active driver devices.

12. The universal control circuit of claim 11, wherein the logic circuit further includes a reset input that is operably coupled to the power supply output, such that the logic circuit is automatically reset upon initial application of power to the power supply.

13. The universal control circuit of claim 12, wherein at least one, but not all, of the logic circuit outputs are operably coupled to the reset input, such that the reset input is sequentially enabled in response to at least a predetermined number of brief interruptions of the voltage supply to the power supply.

14. The universal control circuit of claim 11, wherein the active driver devices are comprised of triacs.

15. The universal control circuit of claim 11, wherein the logic circuit includes a digital counter.

16. The universal control circuit of claim 15, wherein the digital counter has eight outputs.

17. The universal control circuit of claim 16, wherein at least three of the digital counter outputs are coupled via said plurality of switching diodes to the gates of two active driver devices.

18. A method of providing power to a plurality of load combinations, the method comprising the steps of:

upon initial application of regulated D.C. power from an A.C. source voltage which is variable between 120 and 250 VAC, establishing a first configuration such that power is applied from said A.C. source voltage to a first preselected load combination of plural loads; and upon detecting a first brief interruption in supply power, regardless of how much time has intervened between the first brief interruption and the initial application of power, establishing a second configuration such that power is applied from said A.C. source voltage to a second preselected combination of said plural loads; and routing said power to said first and second preselected combinations via a plurality of switching diodes, said switching diodes routing power to each one of plural active driver devices connected to said plural loads in at least one of said first and second preselected combinations.

19. The method of claim 18, and further including the step of:

upon detecting a second brief interruption in supply power, regardless of how much time has intervened between the second brief interruption and the first brief interruption, establishing a third configuration such that power is applied to a third preselected combination of said plural loads.

20. The method of claim 18, and further including the step of:

upon detecting a predetermined number of brief interruptions following initial application of power, regardless of how much time has passed since the initial application of power, resetting to a predetermined condition.

21. A universal control circuit comprising:

A) a power supply having:
- an input coupled to a voltage supply that supplies any of a range of voltages;
- an output that transforms and regulates said voltage supply to provide a substantially constant predetermined DC voltage over said range of voltages of said voltage supply; and
- a voltage supply interrupt detector that is operably coupled to the power supply input and that has a voltage supply interrupt detected signal output;

B) a logic circuit having:
- a digital counter having:
- a power input that is operably coupled to the power supply output;
- a plurality of outputs, wherein some of the outputs are coupled to a diode signal-steering network; and
- a signal input that is operably coupled to the voltage supply interrupt detected signal output; and C) a plurality of active driver devices, wherein each active driver device has a power output and a control gate, each control gate being operably coupled to the diode signal-steering network such that the digital counter outputs are sequentially enabled in response to brief interruptions of the voltage supply to the power supply, said diode signal-steering network including a plurality of switching diodes that route at least one of said plurality of outputs of said digital counter to each one of said plurality of active driver devices.

* * * * *